Figure 1:
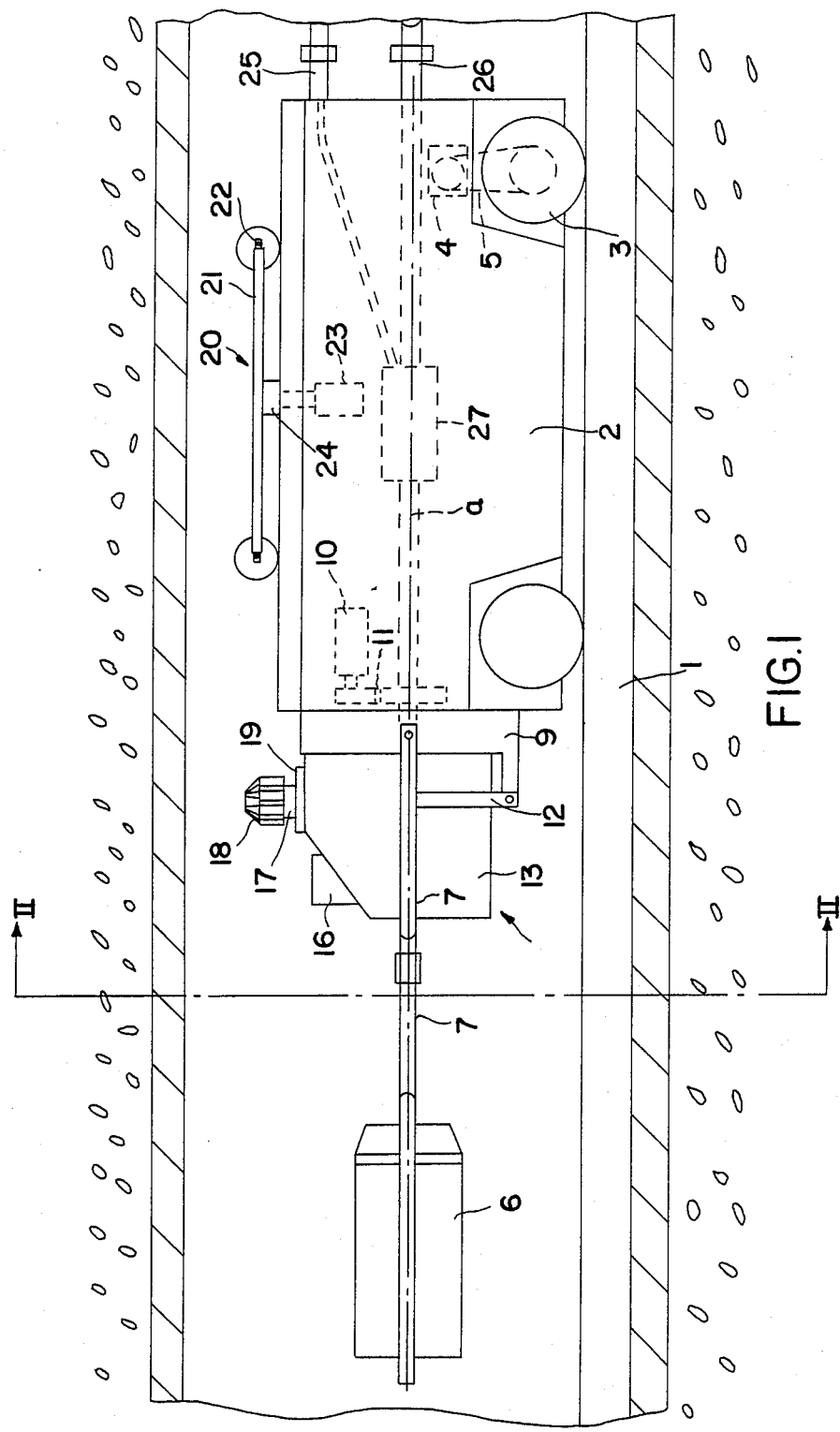

United States Patent [19]

Himmler

[11] Patent Number: 4,986,314

[45] Date of Patent: Jan. 22, 1991

[54] APPARATUS FOR CARRYING OUT REPAIR WORKS ON A DAMAGED PIPELINE WHICH A PERSON CANNOT GET THROUGH

[75] Inventor: Erich Himmler, Zurich, Switzerland

[73] Assignee: Kunststoff-Technik AG Himmler, Zurich, Switzerland

[21] Appl. No.: 123,312

[22] Filed: Nov. 20, 1987

Related U.S. Application Data

[63] Continuation of Ser. No. 899,386, Aug. 1, 1986, abandoned.

[51] Int. Cl.$^5$ .............................................. F16L 55/18
[52] U.S. Cl. ....................................... 138/97; 409/143; 15/104.09; 166/55.7
[58] Field of Search .................... 15/104.05, 104.09; 138/89, 92, 97, 98, 178; 358/83, 100; 408/1 R, 16; 51/281 P, 290; 409/139, 140, 143, 307; 166/55.6, 55.7, 55.8, 55.2, 55, 297

[56] References Cited

U.S. PATENT DOCUMENTS

| | | | |
|---|---|---|---|
| 3,718,978 | 3/1973 | Van Koevering et al. | 138/97 X |
| 4,577,388 | 3/1986 | Wood | 409/143 |
| 4,601,123 | 7/1986 | Gebald et al. | 15/104.09 |
| 4,648,454 | 3/1987 | Yarnell | 409/143 |
| 4,657,449 | 4/1987 | Marich et al. | 15/104.09 |
| 4,785,512 | 11/1988 | Sigel | 166/55.2 |

FOREIGN PATENT DOCUMENTS

| | | | |
|---|---|---|---|
| 0029343 | 5/1981 | European Pat. Off. | |
| 3413294 | 8/1985 | Fed. Rep. of Germany | 138/97 |
| 1331602 | 9/1973 | United Kingdom | |
| 2147080 | 5/1985 | United Kingdom | 138/97 |
| 8303457 | 10/1983 | World Int. Prop. O. | |

Primary Examiner—Henry J. Recla
Assistant Examiner—Glenn T. Barrett
Attorney, Agent, or Firm—Ladas & Parry

[57] ABSTRACT

The apparatus comprises a carriage (2) which carries on one face a working head (8) for a tool such as a milling tool (18). The working head is fully rotatable about the longitudinal axis of the carriage by means of a drive (10) acting on a gear (11) and is held in a bearing (9) and supported by a rotating shackle (12). The milling tool rests on a shaft (17); a mounting flange (19) makes it possible to use various types of tools, and in particular wheel-type tools. The shaft (17) is driven by a hydraulic motor (16). The working head (8) comprises a feed cylinder (13) wherein is located the hydraulic motor (16) just mentioned and the shaft (17) and which can be radially extended with regard to the pipeline (1). On the bearing (9) a holder (7) with a television camera is attached. The television camera only follows the rotational movements of the bearing (9) but not the radial displacements of the feed cylinder (13) and is therefore adjusted in such a way onto the tool (18) that it can cover the entire feed range of the tool.

7 Claims, 3 Drawing Sheets

APPARATUS FOR CARRYING OUT REPAIR WORKS ON A DAMAGED PIPELINE WHICH A PERSON CANNOT GET THROUGH

This is a continuation of co-pending application Ser. No. 899,386 filed Aug. 1, 1986, now abandoned.

The invention resides in an apparatus for carrying out repair work on a damaged pipeline which a person cannot get through.

In Swiss Pat. No. 640 623 respectively in European Pat. No. 0 025 204 there are described a method and an apparatus for sealing a leak in a pipeline laid underground which a person cannot get through. By means of that method and that apparatus such a pipeline, i.e. one having a diameter of about 25 to 100 centimeters (about 10 to 40 inches) can be repaired from the inside if leaks occur in it.

That apparatus comprises amongst other things preferably several drills arranged on a carriage or trolley which radiate from a common hollow shaft extending in the longitudinal direction of the carriage and are displaceable in that radial direction. The drills bore a radial hole each into the pipeline on the location that has been made out by a television camera placed on a small carriage that advances said carriage.

Through the hollow drills and the hole a sealing medium in form of a plastic gel is injected into the soil surrounding the pipeline, the medium curing in the soil and thus sealing the damaged location.

For the purpose intended it was fully sufficient that the hollow shaft could be rotated only within a limited angular range because in view of the greater number of drilling holes and due to the spreading of the injected sealing medium in the soil nevertheless a sealing that extends over the entire periphery of the pipeline was obtained.

Said method has proved to be very suitable because it saves, on pipeline damages the excavation of the pipeline and its subsequent relaying which not only is expensive but also leads to traffic hampering or traffic relocation since most of the pipelines lie below streets and roads. With that method and that apparatus repair costs can be lowered, depending upon their extent, to about a third of the usual costs.

It is an object of the present invention to further develop that apparatus since it has become apparent that in such pipelines besides the already mentioned damages, mostly due to corrosion, there arise also other damages. Whilst on the first mentioned damages the quantity of water to be handled by the pipeline usually increases because water penetrates from the surrounding soil through the holes into the pipeline, the opposite may also occur with damages that hamper the throughflow. Thus it may arise that on a pipeline running at the border of a street or road or at an angle to it, roots from trees or shrubs find a damaged spot, penetrate through the latter and continue to grow into the pipeline. Other cloggings arise due to calcium deposits on the interior of the otherwise undamaged pipeline. Often it happens that a new pipeline is introduced sideways into the existing one; in such a case the new pipeline is introduced through an opening in the pipe wall of the existing pipeline and joined with the latter. However, the mouth of the new pipeline protrudes into the clearance of the existing one, reducing the latter. Also it has happened that on construction works of any kind the layout of the existing pipe network was not consulted or contained errors so that the ground anchors for securing the new edifices or the soil inadvertently penetrated into the existing pipeline during their being driven into the ground and thus also reduced its cross section, in particular if later on dirt carried along by the sewage water piles up on such an obstruction.

A further problem arises with the pipe damages already referred to. Due to the steadily increasing traffic, due to ageing and often also due to pressure rise in the conduit cracks may be formed in the pipeline that are not limited locally but extend over a certain length of the pipeline whereby they do not only run parallel to the axis of the latter but often also inclined or even in a helicoidal way, thus at an angle to that axis. A removal of such damages is possible only with a great effort; in particular one would have to seal the surrounding soil also in the abovementioned manner whereas the invention now provides to seal only the pipeline as such, i.e. along the zig-zag shaped crack which on such cracks is generally sufficient.

One has already tried to solve these problems, however without the desired success or at least with the desired universality, i.e. it was possible to solve but one problem. As an example so-called crown drills are known, but due to their way of operation they must be mated exactly to the nominal diameter of the particular pipeline and in addition they are unable to follow pipe curvatures since their drive axis coincides with the longitudinal axis of the pipeline. Further they can only mill one pipeline, i.e. they operate on the entire periphery of the tube and thus increase its diameter, weakening the tube. A repair of cracks which pass through the entire wall of the tube is not possible.

The use of saw blades sawing off protruding obstacles is known, too, such blades being known under the designation "fox tail" which is derived from the manually operated saws used in woodworking. The problem there particularly resides in clamping the saw blades onto their drives because they must practically sit close to them in order to remove the obstacle fully down to the pipeline. Thus they are suitable only for removing such obstacles but not for repairing cracks.

The disadvantages of the apparatus just mentioned will be overcome by the one according to the invention; also an apparatus is to be provided that can be used universally for repairing damages.

This apparatus according to the invention is characterized by the features recited in claim 1.

Figure 2:
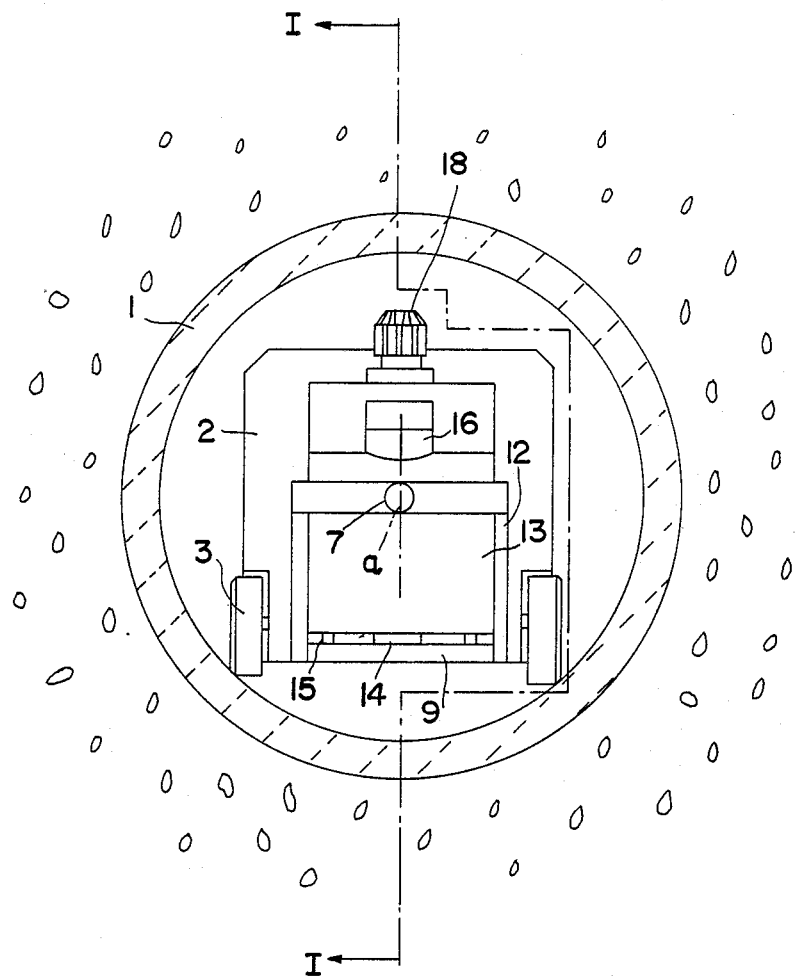
Figure 3:
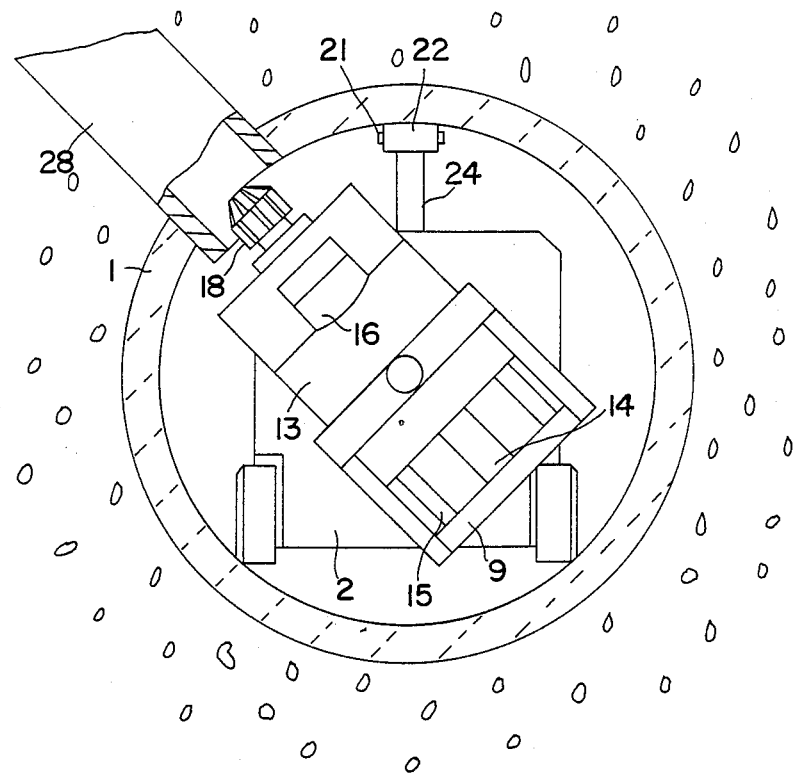

The invention will now be illustrated in an example with reference to the attached drawings; wherein there is disclosed:

in FIG. 1 a cross section through a pipeline with the apparatus therein in a view along line I—I in FIG. 2, in FIG. 2 a cross section through the pipeline along line II—II in FIG. 1, with the apparatus in standard position, and in FIG. 3 a cross section similar to FIG. 2, showing the apparatus during milling of that part of a branch pipeline that protrudes into the pipeline.

With 1 the pipeline is designated which is of such a diameter that it is possible to get through. In this pipeline a carriage 2 has been introduced through a not represented manhole leading from the surface, e.g. the street or road, to the pipeline, this manhole being usually substantially larger than the pipeline itself. The carriage has been conducted on its wheels 3 of which at least those on one axle are driven by a hydraulic motor 4 via chain 5, by remote control to a damaged spot not represented. This spot has been localized by a television camera 6 having a light source, the camera being mounted on a cranked fork-like holder 7. Carriage 2 further comprises a tool holder in form of a working head 8. The latter is rotatably supported in a bearing 9 located on one face of carriage 2 in such a manner that it can rotate by at least one full turn. These rotations are effected by a hydraulic motor 10 within the carriage through a gear 11 (FIG. 1). The big gear wheel of gear 11 determines rotational axis a of working head 8 which also forms the longitudinal axis of carriage 2. It is advantageous if that axis coincides with the pipeline axis because then working head 8 maintains its distance from the pipeline wall during its rotation by 360 degrees.

Due to its weight, working head 8 is supported in a rotating shackle 12 which is rigidly connected to bearing 9. Working head 8 comprises a feed cylinder 13 which in FIG. 2 is represented in its initial, in FIG. 3 however, in its extended position. For advancing and retracting it transversely to longitudinal axis a a hydraulic cylinder device 14 is used which moves feed cylinder 13 on rods 15 radially to the pipeline and independently of the rotational position of the working head. Feed cylinder 13 comprises a second hydraulic motor 16 which serves for driving a shaft 17 for a tool, here a milling tool. Shaft 17 preferably carries a mounting flange 19 to which may be attached also other tools, mostly disc-like ones such as cutting-off wheels, grinding wheels and the like instead of the milling tool shown. Second hydraulic motor 16 displaces radially, too, with feed cylinder 13 during its forwarding motion. Feed cylinder 13 itself can rotate by at least one full turn together with entire working head 9. With it holder 7 and television camera 6 supported by the latter as well as its light source rotate, too, about the same axis; since, however, holder 7 is attached to bearing 9, camera 6 does not displace itself also radially. It is therefore made up in such a manner that it can cover the entire feed range.

For certain works, in particular for repairing local damages, carriage 2 must remain fully stationary. To this effect a blocking device 20 is used. It consists of a resilient longitudinal bow 21 whose ends carry two rollers 22. A hydraulic device 23 located within the carriage advances a bow holder 24 in an outward direction. By doing so, firstly rollers 22 make contact with the pipeline wall; since, however, bow 21 is resilient, it flexes until it, too, engages on the pipeline wall in the range of the bow holder. In this manner the carriage is blocked. The illustrated blocking device has the advantage of being independent of the pipeline diameter. It is shown in FIG. 1 in its non-actuated and in FIG. 3 in its extended position; in FIG. 2 it is not represented for reasons of clarity.

Tool drive shaft 17 is hollow. It may also be equipped with a drill which then drills a hole into the pipe wall. Through the hollow interior of shaft 17 and of the drill primarily water for cooling purposes and later on, after piercing the pipe wall, a plastic gel may be introduced, as already known from the cited prior art. For conducting these liquids as well as the liquid used for the hydraulic motors and devices two conduits 25, 26 are provided. One of them contains a water hose surrounded by electric cables for the television camera and the lighting whereas the other conduit comprises several hoses for the drive liquid as well as two conduits for the two components of the gel which are mixed in a mixing head 27 on carriage 2. Both conduits 25, 26 lead to the service vehicle which is located above the already mentioned vertical manhole and comprises a television monitor as well as a control device which controls all movements of carriage 2 and its members. For the drive liquid a number of conduits is provided in order to enable drive 4 for carriage 2, drive 10 for pivoting working head 8 and drive 14 for shaft 17 to work independently and, on certain works yet to be described, to be actuated simultaneously by the control device. If necessary also more than two conduits may be connected, in particular if pressurized air is needed.

It will be explained with the aid of FIG. 3 what all can be done with tool 18, here e.g. a milling tool, clamped on. In FIG. 3 a branch pipe 28 is shown which on any location after or during construction of the conduit network was not exactly introduced into pipeline 1 or was not flush with it whereby the latter has only been laid free but not excavated. The branch pipe had been inserted into a previously applied opening in the jacket of pipeline 1 and was then joined with the pipeline in any known manner, in the case of a cement pipeline by means of cement or the like. As can be seen, the branch pipe still protrudes with a section 29 into pipeline 1 and therefore reduces its cross section; primarily, however, this section forms a turbulence spot for the water and thus, with a great flow of water, a water damming location which now must be removed. To this effect milling tool 18 is set into rotation, then working head 8 is rotated into its initial position and afterwards, during a slow displacement of carriage 2, is slowly oscillated. Since this milling tool has a conical shape, a clear cutoff of section 29 is possible. With the same movements also cracks in the pipeline can be repaired above all; these cracks often extend over a greater distance but run very irregularly, i.e. sometimes parallel to the pipeline axis and then again at an angle to it. By slowly advancing carriage 2 and by oscillating working head 8 can exactly follow the crack and mill the pipeline; afterwards the groove now formed that way will be glued and filled with an epoxy resin. This work will, however, be taken over by a separate coating apparatus. Roots that protrude into the pipeline will be drilled off; here working head 8 and carriage 2 are practically at standstill. The hole resulting from drilling away the roots will then be filled in the same way as the groove just mentioned.

Instead of the milling tool also other rotating tools may be set onto the shaft, e.g. wire brushes, polishing or metal cutting wheels; the lastmentioned ones are particularly suitable for cutting off ground anchors that protrude transversely into the pipeline and were driven therein by error.

The entire movements are remotely controlled from the service vehicle as already mentioned; particulars can be taken from the prior art already referred to.

Shaft 17 serving for clamping on various tools is hollow. On its rear end location within feed cylinder 13 is connected, via the axis of working head 8, on one hand, to mixing head 27 and on the other hand directly to a water conduit arranged in one of conduits 25, 26. Therefore this apparatus is able, just as the one described in the specifications of the prior art, to perform sealing work on the outside of the pipeline by injecting the gel into the soil. However, only one drill is now available; on the other hand this drill can real all spots along the periphery of the inner side of the pipeline wall. In order to avoid splashing the gel, i.e. the sealing medium, when it leaves the hollow drill, a sealing plate is provided as on the previous apparatus; this shield, however, is no longer a fixed part but is screwed onto flange 19.

I claim:

1. Apparatus for carrying out repairs on a damaged pipeline, the apparatus comprising: a self-propelled carriage having a longitudinal axis; a camera mounted on a carriage to facilitate location of areas to be repaired in the pipeline; a bearing mounted adjacent an end of the carriage, the bearing being substantially immovable with respect to the carriage along the longitudinal axis thereof; drive means for rotating the bearing; a shackle connected to the bearing for rotation therewith, the shackle being spaced from the carriage along the longitudinal axis thereof; and a tool holder mounted on the bearing and shackle such that the shackle is able to bear the weight of the tool holder as well as the forces acting thereon during operation of the tool holder, the tool holder having a working head, a hydraulic feed cylinder mounted on the bearing and shackle with the working head for moving the working head independently of the bearing and shackle in a direction normal to the longitudinal axis, an exchangeable tool member, means for mounting the tool member to the working head, and hydraulic drive means for driving the tool member.

2. Apparatus as claimed in claim 1 wherein the hydraulic drive means comprises a hydraulic motor located on the tool holder and a shaft between the hydraulic motor and the tool.

3. Apparatus as claimed in claim 1 wherein the drive means rotates the bearing about the longitudinal axis of the carriage.

4. Apparatus as claimed in claim 1 further comprising a holder having first and second ends, the first end being mounted on the bearing with the television camera being mounted at the second end thereof, the holder being mounted such that the television camera rotates about the longitudinal axis of the carriage together with the bearing.

5. Apparatus as claimed in claim 1 further comprising a holder having first and second ends, the first end being mounted on the bearing with the television camera being mounted at the second end thereof, the holder being mounted such that the television camera rotates about the longitudinal axis of the carriage together with the bearing, the television camera being capable of being rotated through 360 degrees.

6. Apparatus for carrying out repair work on a damaged pipeline which a person cannot get through, said apparatus comprising a self-propelled carriage; a television camera mechanically coupled to the carriage for finding and locating areas to be repaired in the pipeline; and a tool holder pivotable about the longitudinal axis of the carriage for holding an exchangeable tool that is arranged transversely to said longitudinal axis, said tool holder including a working head rotatable by at least one full turn, said working head comprising a feed cylinder displaceable transversely to the longitudinal axis and having a drive for a shaft and means arranged on said shaft for clamping the exchangeable tool, said working head further comprising a hydraulic cylinder device that displaces the feed cylinder transversely to the longitudinal axis of the carriage independently of the rotational position of the working head;

wherein there is provided on an outside of one face of the carriage a bearing for receiving the working head, said bearing being rotatable by a drive arranged on an inside of said one face, said bearing having an L-shaped cross section and a shackle rigidly connected thereto for rotation therewith, the working head abutting with one face against the bearing and being supported by the shackle between two ends thereof at two points on opposite sides of the working head which are located substantially in a plane passing through the longitudinal axis of the shaft on which the tool clamping means and the tool are arranged.

7. Apparatus according to claim 1 wherein the bearing is further provided with a holder bypassing the working head on either side and supporting the television camera in such a manner that the latter is in coincidence with the longitudinal axis of the carriage, is rotatable with the bearing and the working head and can be adjusted so as to cover the entire feeding range of the feed cylinder and with it the tool.

* * * * *